(12) United States Patent
Strandborg et al.

(10) Patent No.: US 12,326,970 B1
(45) Date of Patent: Jun. 10, 2025

(54) REFINING HEAD POSE TRACKING BASED ON SEAT POSITION AND ORIENTATION

(71) Applicant: Distance Technologies Oy, Helsinki (FI)

(72) Inventors: Mikko Strandborg, Hangonkylä (FI); Thomas Carlsson, Vantaa (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 18/636,357

(22) Filed: Apr. 16, 2024

(51) Int. Cl.
 *G06F 3/01* (2006.01)
 *G02B 27/01* (2006.01)

(52) U.S. Cl.
 CPC ............. *G06F 3/012* (2013.01); *G06F 3/013* (2013.01); *G02B 27/0101* (2013.01); *G02B 2027/0187* (2013.01)

(58) Field of Classification Search
 CPC ..... G06F 3/012; G06F 3/013; G02B 27/0101; G02B 2027/0187
 See application file for complete search history.

(56) References Cited

U.S. PATENT DOCUMENTS

| | | | |
|---|---|---|---|
| 7,406,181 B2 * | 7/2008 | O'Boyle | B60R 21/01538 382/104 |
| 7,898,522 B2 * | 3/2011 | Hildreth | G06T 19/006 345/2.1 |
| 10,599,226 B2 * | 3/2020 | Sprickmann Kerkerinck | G06V 40/28 |
| 2022/0194389 A1 * | 6/2022 | Kim | B60W 40/08 |
| 2024/0157853 A1 * | 5/2024 | Kunz | B60N 2/0244 |

* cited by examiner

*Primary Examiner* — Mihir K Rayan
(74) *Attorney, Agent, or Firm* — Ziegler IP Law Group, LLC.

(57) ABSTRACT

Tracking means is utilised to estimate potential positions of a head of a user sitting on a seat of a vehicle. A three-dimensional (3D) volume where the user's head is likely to be present is determined, based on a current setting of adjustable seat parameter(s), the adjustable seat parameter(s) being detected by sensor(s). It is detected whether at least one of the plurality of potential positions of the head lies outside the 3D volume. When it is detected that at least one of the plurality of potential positions of the head lies outside the 3D volume, the at least one of the plurality of potential positions is considered as an outlier, and a correct position of the user's head is determined as one of the plurality of potential positions of the head that lies within the 3D volume.

20 Claims, 4 Drawing Sheets

REFINING HEAD POSE TRACKING BASED ON SEAT POSITION AND ORIENTATION

TECHNICAL FIELD

The present disclosure relates to systems for refining head pose tracking based on seat positions and orientations. The present disclosure also relates to methods for refining head pose tracking based on seat positions and orientations.

BACKGROUND

Glasses-free augmented-reality (AR) systems (for example, such as automotive head-up displays (HUDs) or similar) have emerged as significant advancement for presenting visual information to users without diverting their attention from their primary tasks, for example, such as driving a vehicle. Some HUDs utilise a head-pose tracking system to determine a viewing direction from where the visual information is to be displayed to user(s).

However, ensuring an accurate operation of the HUD relies heavily on a tracking quality and a responsiveness of the head-pose tracking system. A high tracking quality and responsiveness of the head-pose tracking system is particularly required in dynamic environments, such as inside moving vehicles where sudden movements and vibrations are likely to be experienced by users that are present inside said moving vehicles. Existing head-pose tracking systems often employ visible-light cameras, depth cameras, and/or infrared cameras to capture a continuous stream of images and process said images (for example, using computer vision algorithms) to track head poses of the users. However, the existing head-pose tracking systems are highly unreliable and inefficient in terms of accurately tracking the head poses of the users in real time or near-real time, especially, when such existing head-pose tracking systems are employed in the aforesaid dynamic environments. For example, a quality of depth data measurements by the depth cameras drastically vary with different lighting conditions of a real-world environment. This is because the depth data measurements in direct sunlight are significantly difficult and highly prone to errors and inaccuracies, due to interference of ambient light from a real-world environment with a performance of photosensors in the depth cameras. As a result, the head poses are tracked with considerably high latency and error, leading to generation of pose-inconsistent images. When such pose-inconsistent images are displayed to the users, a viewing experience of the users is adversely affected, and becomes unrealistic and non-immersive. Some existing head-pose tracking systems require several tracking cameras for tracking a head pose of a user, which significantly increases an overall operational cost of such existing head-pose tracking systems.

Therefore, in light of the foregoing discussion, there exists a need to overcome the aforementioned drawbacks.

SUMMARY

The present disclosure seeks to provide a system and a method to accurately and reliably determine a correct position of a head of a user sitting on a seat of a vehicle, in a time-efficient and computationally-efficient manner. The aim of the present disclosure is achieved by a system and a method which incorporate refining head pose tracking based on seat positions and orientations, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:

tracking means;

at least one sensor employed to detect a current setting of at least one adjustable seat parameter of a vehicle; and at least one processor configured to:

utilise the tracking means to estimate a plurality of potential positions of a head of a user sitting on a seat of the vehicle;

determine a three-dimensional (3D) volume where the user's head is likely to be present, based on the current setting of the at least one adjustable seat parameter;

detect whether at least one of the plurality of potential positions of the head lies outside the 3D volume; and when it is detected that at least one of the plurality of potential positions of the head lies outside the 3D volume, consider the at least one of the plurality of potential positions as an outlier, and determine a correct position of the head of the user as one of the plurality of potential positions of the head that lies within the 3D volume.

In a second aspect, an embodiment of the present disclosure provides a method comprising:

utilising tracking means to estimate a plurality of potential positions of a head of a user sitting on a seat of a vehicle;

determining a three-dimensional (3D) volume where the user's head is likely to be present, based on a current setting of at least one adjustable seat parameter of the vehicle, wherein the at least one adjustable seat parameter is detected by employing at least one sensor; and detecting whether at least one of the plurality of potential positions of the head lies outside the 3D volume; and when it is detected that at least one of the plurality of potential positions of the head lies outside the 3D volume, considering the at least one of the plurality of potential positions as an outlier, and determining a correct position of the head of the user as one of the plurality of potential positions of the head that lies within the 3D volume.

The present disclosure provides the aforementioned system and the aforementioned method for accurately and reliably determining the correct position of the head of the user, in a time-efficient and computationally-efficient manner. Herein, the current setting of at least one adjustable seat parameter of the vehicle are beneficially utilised to determine the 3D volume where the head is likely to be present. The correct position of the head is then determined based on which potential positions of the head lie outside the aforesaid 3D volume, and which potential positions of the head lie within the aforesaid 3D volume, wherein all the potential positions are estimated by utilising the tracking means. The at least one of the plurality of potential positions lying outside the 3D volume is irrelevant for determining the correct position of the head of the user, and therefore is discarded. Thus, only those potential positions of the head that lie within the 3D volume are utilised for determining the correct position of the head as these potential positions represent realistically feasible locations of the head. This is because said potential positions of the head that lie within the 3D volume are aligned with a user's expected posture and spatial constraints within the vehicle (namely, according to the current setting of the at least one adjustable seat parameter). Moreover, due to this, the correct position of the head can be determined irrespective of any lighting condition of a real-world environment, unlike in case of the prior art where an accuracy of head pose tracking is highly dependent on a lighting condition of the real-world environment. Beneficially, this may also allow for producing a synthetic light field according to the correct position of the head with a low latency and a reduced error. The system and the method are simple, robust, fast, reliable, support real-time improvement in head pose tracking accuracy, and can be implemented with ease.

Notably, the at least one processor controls an overall operation of the system. The at least one processor is communicably coupled to at least the tracking means and the at least one sensor. In some implementations, the at least one processor is implemented as a processor of a light field display unit. In other implementations, the at least one processor is implemented as a processor of a computing device. Examples of the computing device include, but are not limited to, a laptop, a tablet, a phablet, and a smartphone.

In yet other implementations, the at least one processor is implemented as a cloud server (namely, a remote server) that provides a cloud computing service.

Throughout the present disclosure, the term "tracking means" refers to specialised equipment for detecting and/or following a position of at least the head of the user sitting on the seat of the vehicle. It is to be understood that the user sitting on the seat of the vehicle could be a driver of the vehicle or be a passenger in the vehicle. Optionally, the tracking means is implemented as at least one tracking camera. The at least one tracking camera may comprise at least one of: at least one visible-light camera, at least one infrared (IR) camera, at least one depth camera. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of a given depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera, and the at least one depth camera) may be utilised in the tracking means. When different types of images captured by the various different types of cameras are utilised, the location of the user's head can be determined highly accurately, as results obtained from one type of image can be used to refine results obtained from another type of image. Herein, these different types of images constitute tracking data collected by the tracking means, wherein said tracking data may be in the form of at least one of: visible-light images, IR images, depth images.

Optionally, when utilising the tracking means, the at least one processor is configured to employ at least one image processing algorithm for processing said tracking data, to estimate the plurality of potential positions of the user's head. Utilising tracking cameras for estimating potential positions of a user's head is well-known in the art. Optionally, the plurality of potential position of the user's head are represented in a given coordinate space. As an example, the given coordinate space may be a Cartesian coordinate space. It will be appreciated that the tracking means repeatedly tracks the position of the user's head throughout a given session of using the system. This allows for repeatedly estimating the plurality of potential positions of the user's head in real time or near-real time.

Throughout the present disclosure, the term "sensor" refers to equipment that is operable to detect (namely, sense) a current setting of a given adjustable seat parameter of the vehicle. In some implementations, the at least one sensor is employed to detect the current setting for at least one front seat of the vehicle. In other implementations, the at least one sensor is employed to detect the current setting for at least one back seat of the vehicle. In yet other implementations, the at least one sensor is employed to detect the current setting for both the at least one front seat and the at least one back seat of the vehicle (namely, for all seats of the vehicle). The vehicle could, for example, be a car, a truck, an aircraft, a speed boat, or the like.

Throughout the present disclosure, the term "adjustable seat parameter" refers to a characteristic of the seat (or its part) that can be modified to accommodate different preferences or requirements of the user. It is to be understood that seat parameters are typically designed to be adjustable (namely, customizable) for allowing the user to tailor a seat configuration according to his/her need for comfort and ergonomics. Furthermore, the term "current setting" of a given adjustable seat parameter refers to a current state of the characteristic of the seat (or its part). Optionally, the current setting of the at least one adjustable seat parameter is represented in the given coordinate space.

Optionally, the at least one adjustable seat parameter comprises at least one of: a position of the seat, an orientation of a backrest of the seat, a height of a lower part of the seat from a floor of the vehicle, an orientation of the lower part of the seat, a position of a neck support of the seat, an orientation of the neck support, a curvature of a lumbar support of the seat. In this regard, the aforesaid adjustable seat parameters directly or indirectly affect a position of the user's head in a 3D space of the vehicle, and thus could be beneficially utilised for determining the 3D volume, which subsequently enables in determining the correct position of the head (namely, in improving an accuracy of tracking of the user's head). the position of the seat may change, for example, when the seat is shifted along a horizontal plane and/or a vertical plane. The position of the seat may also change when the seat is rotated along a given axis of rotation. The orientation of the backrest could be measured with respect to a given plane, for example, a plane along the lower part of the seat (namely, a seat cushion) or a plane along the floor of the vehicle. The orientation of the backrest may be adjusted by using a recline mechanism that is built into the seat. The height of the lower part of the seat may be adjusted to improve a visibility of the user to see his/her surroundings (for example, through a window of the vehicle) and an ergonomic posture of the user while being seated in the vehicle. The orientation of the lower part of the seat may be adjusted to improve a thigh support for the user. The position and the orientation of the neck support may be adjusted to provide a comfort and support to a neck region of the user and to achieve a proper head alignment of the user while being seated in the vehicle. The orientation of the neck support could be measured with respect to a given plane, for example, a plane along the backrest of the seat. The neck support may also help alleviate neck strain and improve an overall seating comfort of the user. The lumbar support of the seat helps in providing an additional support to a lumbar region of a body of the user, in order to reduce a lower back fatigue and discomfort during prolonged periods of sitting in the vehicle. The curvature (namely, a shape or contour) of the lumbar support may be adjusted to maintain a natural curve of a spine of the user while being seated in the vehicle.

Optionally, the at least one sensor comprises at least one camera, wherein the at least one processor is configured to process at least one image captured by the at least one camera, to determine the current setting of the at least one adjustable seat parameter. In this regard, the at least one image represents visual information pertaining to at least the seat of the vehicle. Optionally, when processing the at least one image, the at least one processor is configured to: extract a plurality of features from the at least one image; identify the seat, based on the plurality of features; and determine the current setting of the at least one adjustable seat parameter for the identified seat by utilising a 3D model of the seat. The aforesaid identification of the seat could be performed using at least one object detection algorithm and at least one object segmentation algorithm, to isolate a relevant part of the at least one image from its background. The term "three-dimensional model of a seat" refers to a data structure that comprises comprehensive information pertaining to the seat. Such a comprehensive information is indicative of at least one of: a plurality of features of the seat or its part, a shape of the seat or its part, a size of the seat or its part, a pose of the seat or its part, a material of the seat or its part, a colour and an optical depth of the seat or its part, a position of the seat, an orientation of a backrest of the seat, a height of a lower part of the seat from a floor of the vehicle, an orientation of the lower part of the seat, a position of a neck support of the seat, an orientation of the neck support, a curvature of a lumbar support of the seat. Beneficially, the current setting determined in the aforesaid manner is highly accurate and reliable, and thus facilitates in determining the 3D volume where the user's head is likely to be present accurately (as discussed later). The term "pose" encompasses a position and/or an orientation of the seat or its part. The 3D model of the seat may be generated in the form of a 3D polygonal mesh, a 3D point cloud, a 3D surface cloud, a voxel-based model, or similar. Optionally, the 3D model of the seat is generated in the given coordinate space. Optionally, the at least one processor is configured to store the 3D model of the seat at a data repository that is communicably coupled to the at least one processor. The data repository may be implemented as a memory of the at least one processor, a memory of the computing device, a cloud-based database, or similar.

Additionally, optionally, the at least one sensor further comprises at least one of: a position sensor, an orientation sensor, a height sensor, a pressure sensor. The technical benefit of utilising at least one of the aforesaid sensors, in addition to the at least one camera, is that detection and/or tracking of the at least one adjustable seat parameter could be performed with an improved accuracy and precision, which enables in determining the current setting highly accurately. The position sensor could be employed to detect and/or track, for example, the position of the seat and the position of the neck support. Examples of the position sensor may include, but are not limited to, a linear potentiometer, an optical encoder, and a Hall-effect sensor. The orientation sensor could be employed to detect and/or track, for example, such as the orientation of the backrest, the orientation of the neck support, and the orientation of the lower part of the seat. Examples of the orientation sensor may include, but are not limited to, a rotary encoder, an inclinometer, a gyroscope, and an accelerometer. The height sensor could be employed to detect and/or track the height of the lower part of the seat from the floor of the vehicle. Examples of the height sensor may include, but are limited to, an ultrasonic sensor, a laser rangefinders, and an image sensor. The pressure sensor could be employed to detect and/or track the curvature of the lumbar support. Examples of the pressure sensor may include, but are limited to, a piezoelectric sensor and a strain gauge sensor.

Throughout the present disclosure, the term "three-dimensional volume" refers to a portion of a 3D space of the vehicle in which the user's head is likely to be present. In other words, the 3D volume can be understood to be a volume inside the vehicle in which each point indicates a realistically possible (namely, a physically possible) location of the user's head. The 3D volume need not necessarily have a definite shape and/or size, and thus could have any shape and/or size.

It will be appreciated that the current setting of the at least one adjustable seat parameter allows the at least one processor to ascertain a comprehensive understanding of a seating posture of the user within the vehicle (namely, the user's spatial relationship within the vehicle). Such a comprehensive understanding allows the at least one processor to accurately estimate likely positions of the user's head within the 3D space of the vehicle, in order to determine the 3D volume. As an example, a combination of two or more adjustable seat parameters may provide a spatial context for a position of the user within the vehicle, which facilitates in ascertaining a reference frame for estimating the user's head positions. As another example, some adjustable seat parameters, for example, such as the curvature of the lumbar support curvature and the orientation of the neck support may directly influence a user's posture and a head position within the vehicle, which facilitates in ascertaining likely locations of the user's head within a vehicle space. As the user may change his/her seating posture or may adjust the at least one adjustable seat parameters, the at least one processor would continuously update its understanding of the user's spatial relationship within the vehicle. Such a dynamic adaptation potentially ensures accurate and responsive determination of the 3D volume where the user's head is likely to be present.

Notably, since coordinates of each of the plurality of potential positions of the head, and coordinates of each position within the 3D volume are readily known, the at least one processor can easily and accurately detect which potential positions of the head would lie outside the 3D volume and which potential positions of the head would lie within the 3D volume, for example, by comparing the coordinates of each of the plurality of potential positions with the coordinates of each position within the 3D volume. It will be appreciated that the at least one processor could also employ a point-in-volume technique, depending on a shape of the 3D volume. When the 3D volume has a simple shape (for example, such as a cube, a sphere, a cylinder, or similar), the point-in-volume technique may involve using at least one mathematical formula to determine whether a given potential position lies within or outside the 3D volume. In an example, when the 3D volume has a spherical shape, a distance between the given potential position and a centre of the 3D volume may be compared to a radius of a sphere, in order to determine whether the given potential position lies within or outside the 3D volume. However, when the 3D volume has a complex shape, for example, such as an irregular, freeform shape or a polyhedral shape, some well-known algorithms may be required for decomposing the 3D volume into simpler shapes, in order to perform point-in-volume techniques for said simpler shapes. The point-in-volume technique is well-known in the art.

When the at least one of the plurality of potential positions of the head lies outside the 3D volume, it means that the at least one of the plurality of potential positions lies in an area in which a position of the user's head is not realistically feasible or possible. In other words, the at least one of the plurality of potential positions is irrelevant or improbable for determining the correct position of the head of the user. Therefore, the at least one of the plurality of potential positions is considered to be the outlier (namely, is ruled out or discarded from the plurality of potential positions), because it could not be considered as the correct position of the head of the user. As an example, a position of the head of the user cannot be inside the neck support of the seat; therefore, any potential position of the head of the user that corresponds to a position of a point that lies inside the neck support of the seat is considered to be an outlier. A potential position of the head that lies within the 3D volume is determined as the correct position of the head because this ensures that the at least one processor focuses on potential positions that are realistically feasible and aligned with the user's expected posture and spatial constraints within the vehicle. By prioritising such potential positions, the at least one processor could accurately provide more reliable assessments of the user's head location. Additionally, by focusing on only correct head positions within the 3D volume, a likelihood of false positives or inaccuracies could be minimised, resulting into a reliable and accurate determination of the correct position of the head in various operational scenarios (for example, in different lighting conditions of a real-world environment in which the vehicle is present).

Optionally, the plurality of potential positions of the head of the user are estimated in a form of a probability cloud, wherein each potential position in the probability cloud is assigned a probability of said potential position being the correct position of the head of the user, wherein the at least one processor is configured to:

assign a weight to a probability of a given potential position, based on at least one of: whether the given potential position lies outside or within the 3D volume, whether the given potential position is located in a proximity of a centre of the 3D volume or a periphery of the 3D volume;

calculate a weighted probability of the given potential position, based on the weight and the probability of the given potential position; and when determining the correct position of the head of the user, select the one of the plurality of potential positions of the head that lies within the 3D volume and that has a highest weighted probability from amongst weighted probabilities of the plurality of potential positions.

Optionally, in this regard, a probability of the given potential position being the correct position of the head of the user is determined, based on at least one of: at least one previous head position, a velocity with which the position of the head is changing, an acceleration with which the position of the head is changing. This may because the probability of the given potential position being the correct position of the head could be influenced by the fact that whether or not the given potential position is in a proximity the at least one previous head position. In addition to this, said probability could also be influenced by the fact that how much the given potential position is in a proximity the at least one previous head position (namely, an extent of the proximity). This is because those potential positions that are relatively closer to the at least one previous head position would have a higher probability of being the correct position, as compared to other potential positions that are relatively far from the at least one previous head position. Moreover, similarly, when considering the velocity and/or the acceleration, the at least one processor may ascertain an intensity and a direction with which the user's head is moving, which can influence the probability of the given potential position being the correct position of the head.

It will be appreciated that greater the probability of a given potential position, greater is the weight assigned to said probability, and vice versa. In this regard, when the given potential position lies outside the 3D volume, the probability of said given potential position being the correct position is lesser, and thus the weight assigned to said probability is also lesser, as compared to a case when the given potential position lies within the 3D volume. This is because when the given potential position lies outside the 3D volume, it indicates that said given potential position may be erroneous and be less likely to represent the correct position of the head. On the other hand, when the given potential position lies within the 3D volume, it indicates that said given potential position may be feasible and be likely to represent the correct position of the head. Similarly, when the given potential position is located in the proximity of the centre of the 3D volume, the probability of said given potential position being the correct position is greater, and thus the weight assigned to said probability is also greater, as compared to a case when the given potential position is located in the periphery of the 3D volume. Greater the proximity of the given potential position with the centre of the 3D volume, greater is the probability and its assigned weight, and vice versa. Optionally, the at least one processor is configured to calculate the weighted probability of the given potential position as a product of the weight and the probability of the given potential position. When the weighted probabilities of the plurality of potential positions are available to the at least one processor, the one of the plurality of potential positions having the highest weighted probability is selected as the correct position of the head. In an example, for sake of simplicity and better understanding, there may be 5 potential positions P1, P2, P3, P4, and P5 of the head having probabilities 0.85, 0.93, 0.51, 0.20, and 0.37, respectively. The probabilities 0.85, 0.93, 0.51, 0.20, and 0.37 may have weights W1, W2, W3, W4, and W5, respectively, wherein a decreasing order of a magnitude of said weights is: W2, W1, W3, W5, W4. In such an example, the potential position P2 is selected as the correct position of the head of the user.

Optionally, the 3D volume is determined further based on at least one of:
  a simulation model of a human sitting on the seat,
  a biomechanical model of a head, a neck, a spine and a posterior part of a human.

The term "simulation model" refers to a digital model (namely, a digital prototype) of a real-world object (for example, such as a human). The simulation model facilitates in predicting a behaviour of the real-world object in real-world conditions. It will be appreciated that the simulation model of the human sitting on the seat of the vehicle represents a virtual environment wherein physical interactions between the human and the vehicle could be replicated and analysed for various driving conditions (for example, such as acceleration, braking, steering manoeuvres, and the like). Thus, by using the simulation model of the human sitting on the seat, the at least one processor could reliably and accurately predict how physical interactions between the human and the vehicle (for example, such as a change in an acceleration and/or an orientation of the vehicle) would affect a location of the user's head in an (actual) real-world scenario, and thus it can be anticipated that at which locations the user's head is likely to be present when the user is sitting on the seat. Beneficially, this facilitates in generating the 3D volume in a highly accurate and realistic manner. It will be appreciated that the simulation model could be generated based on a physical experimentation (wherein impacts on a mannequin of the human may be analysed under various driving conditions), or be generated without any need for the physical experimentation. Optionally, the simulation model depends on at least one of: a location of a seat on which the human is sitting, whether or not the human has put on a seat belt, a height of the human's torso from a level of the seat on which the human is sitting. Various techniques for generating simulation models of humans sitting inside vehicles are well-known in the art. This has been also illustrated in conjunction with FIG. 4, for clarity and better understanding.

Furthermore, the term "biomechanical model" refers to a computational representation and simulation of a mechanical behaviour and interactions of a biological structure. It will be appreciated that the biomechanical model of the head, the neck, the spine and the posterior part of the human provides a comprehensive representation of anatomical structures and physiological responses of the human to external forces, for example, such as those experienced during a vehicular motion. Thus, by using the aforesaid biomechanical model, the at least one processor can reliably and accurately predict how the physical interactions between the human and the vehicle would affect the location of the user's head in an (actual) real-world scenario, and thus it can be anticipated that at which locations the user's head is likely to be present when the user is sitting on the seat. Beneficially, this facilitates in generating the 3D volume in a highly accurate and realistic manner. It will also be appreciated that the posterior part of the human comprises a basin (namely, a pelvis or a butt) of the human, and could also comprise legs and feet of the human. The biomechanical model of the human may represent a mechanical connection (namely, a mechanical joint) between each pair of consecutive parts of the human, for example, such as a mechanical connection between the head and the neck, a mechanical connection between the neck and the spine, a mechanical connection between the spine and the basin, and the like. Furthermore, when the human is considered to be sitting on the seat of the vehicle, all the parts of the human may be considered to be coupled to respective mechanical arrangements, wherein a given mechanical arrangement comprises at least a spring element and a damping element. This has been also illustrated in conjunction with FIG. 5, for clarity and better understanding. Optionally, the at least one of: the simulation model, the biomechanical model, are pre-generated and pre-stored at the data repository.

Moreover, optionally, the at least one processor is configured to:
  estimate a height of an upper body of the user based on the current setting of the at least one adjustable seat parameter; and
  refine at least one of: the simulation model, the biomechanical model, to be specific to the user, based on the height of the upper body of the user.

In this regard, estimating the height of the upper body (including a head and a torso) of the user, based on the current setting of the at least one adjustable seat parameter could be feasible due to an interplay between a seating posture of the user on the seat and how the seat (or its part) has been adjusted (namely, configured) for sitting purposes. In other words, the at least one adjustable seat parameter (for example, at least one of: the height of the lower part of the seat, the orientation of the lower part, the orientation of the backrest) directly influences the sitting posture of the user, and thus could be utilised for estimating the height of the upper body. For example, raising the height of the lower part of the seat typically elevates the head and the torso of the user, while lowering the height of the lower part has an opposite effect. Thus, for a taller user, the height of the lower part of the seat may be lesser, as compared to a case when the user is shorter. Similarly, adjusting the orientation of the backrest affects an angle at which the user's torso is positioned relative to the lower part of the seat, thereby influencing an alignment of the upper body (including the head and the torso) of the user. In this regard, by taking into account the current setting of the at least one adjustable seat parameter (represented in the given coordinate system) and well-known knowledge of human anatomy and ergonomics, the at least one processor can easily ascertain the seating posture of the user resulting from an adjustment of the at least one adjustable seat parameter, and thus the height of the upper body of the user can be accurately estimated. For example, greater the height of the lower part of the seat and more upright the orientation of the backrest, greater is the probability of the height of the upper body being taller, and vice versa. The aforesaid estimation may also utilise a coordinate geometry-based technique and/or a trigonometry-based technique.

It will be appreciated that different users may have different heights of the upper body and thus may have different physiological responses to the various driving conditions. In such a case, the at least one of: the simulation model, the biomechanical model is refined (namely, adjusted) on a per-user basis. This potentially ensures that the (refined) simulation model and/or the (refined) biomechanical model is/are well-applicable and suitable (for example, for accurately anticipating locations of a head) for a given user sitting on a seat of the vehicle, as compared to a scenario where a same simulation model is to be employed for every user. Beneficially, this allows for accurately and reliably determining the 3D volume corresponding to a given user, based on the at least one of: the simulation model, the biomechanical model. In this way, the head acceleration signal is also realistically determined.

Furthermore, optionally, the at least one processor is configured to:
  estimate a location of a posterior part of the user, based on the current setting of the at least one adjustable seat parameter; and
  determine an origin of the biomechanical model, based on the location of the posterior part of the user.

In this regard, the at least one adjustable seat parameter (for example, at least one of: the position of the seat, the height of the lower part of the seat, the curvature of the lumbar support) directly influences a sitting posture of the user, and thus could be utilised for estimating the location of the posterior part of the user. For example, the position of the seat may directly affect a location of a body of the user within the vehicle such that a forward position of the seat likely brings the posterior part closer to a front edge of the seat, while a backward position of the seat shifts the posterior part towards a rear edge of the seat. Similarly, a higher seat height may raise the posterior part with respect to the floor of the vehicle, while a lower seat height may lower the posterior part with respect to the floor of the vehicle, thereby influencing the position of the posterior part in a vertical plane. The curvature of the lumbar support may also impact the seating posture of the user and a distribution of a pressure along a spine and a lower back of the user, as a well-supported lumbar region of the user encourages a more upright posture of the user, and the posterior part may then be positioned towards a central region of the lower part of the seat. Thus, by taking into account the current setting and the knowledge of human anatomy and ergonomics, the at least one processor can easily estimate the position of the posterior part. Such an estimation may utilise a coordinate geometry-based technique and/or a trigonometry-based technique.

It will be appreciated that determining the origin of the biomechanical model, based on the location of the posterior part, is important because it establishes a reference point for analysing biomechanics of the body of the user. In other words, the origin of the biomechanical model may be served as an initial point with respect to which several biomechanical measurements and calculations (for example, such as joint angles, muscle forces, a spinal alignment, and the like) could be made, in response to the external forces, such as those experienced during the vehicular motion. As an example, with the origin of the biomechanical model being aligned to the posterior part, simulations could be customised to account for individual differences in a body size, a shape, and a biomechanics of the user. Therefore, this enables the at least one processor in predicting locations of the user's head within the vehicle with an improved accuracy and reliability. Beneficially, this facilitates in generating the 3D volume in a highly accurate and realistic manner Optionally, the at least one processor is configured to:
  estimate an orientation of a spine of the user, based on the current setting of the at least one adjustable seat parameter; and
  employ the biomechanical model when determining the 3D volume, based on the orientation of the spine of the user.

In this regard, the at least one adjustable seat parameter (for example, at least one of: the orientation of the backrest, the orientation of the neck support, the curvature of the lumbar support) directly influences a sitting posture of the user, and thus could be utilised for estimating the orientation of the spine of the user. For example, the orientation of the backrest may provide information about an inclination of the user's spine. When the backrest is in an upright orientation, it indicates a vertical alignment of the user's spine, whereas when the backrest is in a reclined orientation, it indicates an inclined posture of the user's spine. Moreover, since a forward tilt or a backward tilt of the neck support may affect the position of the user's head in relation to the user's torso, by assessing the orientation of the neck support relative to the backrest or a reference plane, the orientation of the spine of the user can be inferred. Furthermore, the curvature of the lumbar support may influence an alignment of the lumbar region of the body of the user and an overall curvature of the user's spine. Thus, by taking into account the current setting and the knowledge of human anatomy and ergonomics, the at least one processor can easily estimate the orientation of the spine. Such an estimation may utilise a coordinate geometry-based technique and/or a trigonometry-based technique.

It will be appreciated that the orientation of the spine typically influence the position of the user's head while seated. Different users may have different spinal alignments and seating preferences based on factors, for example, such as a body type, a posture habit, an existing musculoskeletal conditions. By utilising (real time or near-real time data on) the orientation of the user's spine within the biomechanical model, the at least one processor can reliably and accurately predict how physical interactions between the human and the vehicle would affect the location of the user's head in an (actual) real-world scenario, and thus it can be anticipated that at which locations the user's head is likely to be present when the user is sitting on the seat. Beneficially, this facilitates in generating the 3D volume in a highly accurate and realistic manner.

Optionally, the vehicle comprises a plurality of seats, and the system further comprises at least one additional sensor per seat, employed to sense at least one of: whether a given seat is occupied, a weight applied to the given seat, a pressure applied to the given seat,
  wherein the at least one processor is configured to:
    detect when the given seat is occupied by a given user, based on the at least one of: whether the given seat is occupied, the weight applied to the given seat, the pressure applied to the given seat; and perform the step of determining the 3D volume for the given seat, only when it is detected that the given seat is occupied by the given user.

In this regard, the at least one additional sensor comprises at least one of: a load sensor, an occupant presence sensor. For example, when the given user sits on the given seat, a weight of the given user applies a pressure to the at least one additional sensor, causing it to detect a presence of said weight. Such a detection indicates that the given seat is occupied. Examples of the position sensor may include, but are not limited to, a load cell and a pressure-sensitive pad. Examples of the occupant presence sensor may include, but are limited to, a pressure sensor, a capacitive sensor, an infrared (IR) sensor, an ultrasonic sensor. Sensors for sensing an occupancy of the given seat is occupied, the weight applied to the given seat, and/or the pressure applied to the given seat are well-known in the art. It will be appreciated that when it is detected that the given seat is not occupied by the given user, it would not be beneficial to determine the 3D volume for the given seat, as determining the 3D volume for an unoccupied seat would be a waste of computational resources and processing time of the at least one processor. Thus, when the seat is detected to be empty, allocating resources to determine the 3D volume would be unnecessary and inefficient. Beneficially, this facilitates in saving the computational resources and the processing time of the at least one processor. It will also be appreciated that there could be a scenario where a given seat would actually be occupied by some goods (for example, a large-sized heavy box), but not by the given user. Thus, in such a scenario also, the at least one processor does not perform the step of determining the 3D volume for the given seat.

Optionally, the system further comprises a light field display unit, and an optical combiner arranged on an optical path of the light field display unit and on an optical path of a real-world light field of a real-world environment, wherein the at least one processor is configured to:
  utilise the tracking means to determine a relative location of a first eye and of a second eye of the user with respect to the optical combiner;
  refine the relative location of the first eye and of the second eye, based on the correct position of the head of the user;
  generate an input to be employed by the light field display unit for producing a synthetic light field, based on the relative location of the first eye and of the second eye of the user with respect to the optical combiner; and
  employ the input at the light field display unit to produce the synthetic light field presenting virtual content, wherein the optical combiner is employed to reflect a first part and a second part of the synthetic light field towards the first eye and the second eye of the user, respectively, whilst optically combining the first part and the second part of the synthetic light field with the real-world light field.

In this regard, the tracking means is optionally employed for detecting and/or following a location of the first eye and the second eye of the user also. The first eye could be one of a left eye of the user and a right eye of the user, whereas the second eye could be another of the left eye and the right eye. It will be appreciated that irrespective of where the at least one tracking camera is arranged, a relative location of the at least one tracking camera with respect to the optical combiner is fixed, and is pre-known to the at least one processor. This enables to determine the relative location of the first eye and of the second eye of the user with respect to the optical combiner. Optionally, in this regard, when the tracking means are utilised to detect and/or follow the location of the first eye and of the second eye, a location of the first eye and of the second eye with respect to the at least one tracking camera is accurately known to the at least one processor, from the tracking data collected by the tracking means. Thus, the at least one processor can easily and accurately determine the relative location of the first eye and of the second eye with respect to the optical combiner, based on the relative location of the at least one tracking camera with respect to the optical combiner and the location of the first eye and of the second eye with respect to the at least one tracking camera. Optionally, the relative location of the first eye and of the second eye is represented in the given coordinate space.

Furthermore, optionally, the tracking means repeatedly tracks the location of both eyes of the user throughout a given session of using the system. In such a case, the at least one processor is configured to repeatedly determine the relative location of the first eye and of the second eye with respect to the optical combiner (in real time or near-real time). Beneficially, this potentially allows for presenting the user with an augmented view of the synthetic light field with the real-world light field in an autostereoscopic manner. It is to be understood that when more than one seat is occupied in the vehicle, for example, in a case when more than one user is present in the vehicle, the at least one processor is configured to determine relative locations of both eyes of each user in a same manner as discussed hereinabove. Moreover, the relative location of the first eye and of the second eye is determined with respect to the optical combiner, because the synthetic light field (that is being produced by the light field display unit) would be presented to the user via the optical combiner only.

It will be appreciated that once the correct position of the head of the user is known (as discussed earlier), the at least one processor could easily and accurately refine the relative location of the first eye and of the second eye, because the first eye and the second eye are present at a fixed location on the head of the user, and any movement of the head may highly likely result in similar corresponding changes in the relative location of the first eye and of the second eye. Such a refinement may involve employing geometric transformations (namely, geometric adjustments) on the (tracked) relative location of the first eye and of the second eye, based on the correct position of the head of the user. It will be appreciated that when the (refined) relative location of the first eye and of the second eye is utilised, the input is accurately and realistically generated for producing the synthetic light field.

The term "optical combiner" refers to specialised equipment that is capable of reflecting a corresponding part of the synthetic light field towards a given eye of a given user, whilst optically combining said part of the synthetic light field with the real-world light field. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. It will be appreciated that when more than one seat is occupied in the vehicle, for example, in a case when more than one user is sitting in the vehicle, some users may directly face the optical combiner (namely, in almost a straight manner), while remaining users may face the optical combiner in a diagonal manner (namely, obliquely or sideways). Optionally, a tilt angle of the optical combiner with respect to an image plane of the light field display unit lies in a range of 30 degrees and 60 degrees.

The input employed by the light field display unit can be in various different forms, depending on a type of the light field display unit that is implemented. As a first example, in case of a hogel-based light field display unit or a lenticular array-based light field display unit or a parallax barrier-based light field display unit, the input can be in a form of a light field image comprising pixels. As a second example, in case of a hologram-projector based light field display unit, the input is in a form of a holographic recording having a holographic interference pattern. As a third example, in case of a scanning-laser based light field display unit, the input can be in a form of any one of: image data, vector graphics, vector paths. As a fourth example, in case of a cathode ray tube (CRT)-like light field display unit, the input is in a form of a video signal comprising analog electrical signals. All the aforementioned forms of light field display units and their corresponding inputs are well-known in the art.

In case of a light field image, the input may be understood to be a two-dimensional (2D) image comprising a plurality of pixels, wherein a first part of the input comprises a first set of pixels from amongst the plurality of pixels that is responsible for generating the first part of the synthetic light field that corresponds to the first eye, and a second part of the input comprises a second set of pixels from amongst the plurality of pixels that is responsible for generating the second part of the synthetic light field that corresponds to the second eye. It will be appreciated that the pixels belonging to the first set are not arranged in a continuous manner across the light field image (namely, the input); similarly, the pixels belonging to the second set are also not arranged in a continuous manner across the light field image. Optionally, the pixels belonging to the first set and the pixels belonging to the second set may be arranged in alternating vertical stripes across a horizontal field of view of the light field image, wherein each vertical stripe comprises one or more scanlines of pixels. This is because humans perceive depth mainly based on horizontal binocular parallax. Thus, in this way, the light field image would be considerably different as compared to a conventional 2D image that is displayed via conventional 2D displays, because the (single) light field image would comprise visual information corresponding to the first eye as well as the second eye of the user.

In some implementations, the virtual content presented by the synthetic light field corresponds to at least one virtual object. Optionally, in this regard, the at least one processor is configured to generate the input from a perspective of the relative location of the first eye and of the second eye of the user, by employing a three-dimensional (3D) model of the at least one virtual object. The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information. The term "three-dimensional model of a virtual object" refers to a data structure that comprises comprehensive information pertaining to the virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model of the at least one virtual object may be generated in the form of a 3D polygonal mesh, a 3D point cloud, a 3D surface cloud, a voxel-based model, or similar. Optionally, the 3D model of the at least one virtual object is generated in the given coordinate space. Optionally, the at least one processor is configured to store the 3D model of the at least one virtual object at the data repository.

The term "real-world light field" refers to a light field emanating from the real-world environment in which a given user is present. Moreover, the term "synthetic light field" refers to a light field that is produced (namely, generated) synthetically by the light field display unit. It will be appreciated that in case of the real-world light field, light from, for example, a natural light source (such as the Sun) and/or an artificial light source (such as a lamp, a bulb, a tube-light, or similar), are reflected off real-world objects (or their portions) to be incident towards the first eye and the second eye of the user. In this way, visual information (for example, such as colour information, optical depth information, and the like) pertaining to said real-world objects is typically perceived by the left eye and the right eye. On the other hand, in case of the synthetic light field, light emanating from the light field display unit, upon reflecting off the optical combiner, is incident on the first eye and the second eye of the user. In this way, visual information pertaining to the at least one virtual object (namely, the virtual content) can be perceived by the first eye and the second eye.

It will also be appreciated that when the optical combiner reflects the first part and the second part of the synthetic light field towards the first eye and the second eye, respectively, it means that light produced by a first part of the input, generating the first part of the synthetic light field, is directed towards the first eye upon reflecting off the optical combiner. Simultaneously, light produced by a second part of the input, generating the second part of the synthetic light field, is directed towards the second eye upon reflecting off the optical combiner. Therefore, upon said reflection of the first part and the second part of the synthetic light field, visual information corresponding to the first part of the input and the second part of the input is perceived by the first eye and the second eye, respectively. It is to be understood that due to binocular disparity, visual information for the first eye and visual information for the second eye would be slightly offset from each other. Beneficially, this enables in perceiving depth, when the virtual content is presented to the user using the synthetic light field. The binocular disparity is well-known in the art. Additionally, when the first part and the second part of the synthetic light field are optically combined with the real-world light field, the virtual content is perceived by the left eye and the right eye, along with the visual information pertaining to the real-world objects present in the real-world environment. Advantageously, this provides a result that is similar to displaying a combined view of a virtual image augmenting a real-world image to the user.

Further, the term "light field display unit" refers to specialised equipment that is capable of producing the synthetic light field. In other words, the light field display unit is utilised to employ the input (generated by the at least one processor) to produce the synthetic light field at a given resolution. As mentioned earlier, different types of light field display units can be implemented. For example, the light field display unit can be any one of: a hogel-based light field display unit, a lenticular array-based light field display unit, a parallax barrier-based light field display unit, a hologram-projector based light field display unit, a scanning-laser based light field display unit, a CRT-like light field display unit.

It will be appreciated that when more than one seat is occupied in the vehicle, for example, in a case when more than one user is sitting in the vehicle, the same input is employed by the light field display unit for producing the synthetic light field presenting the virtual content to the more than one user simultaneously. In such a case, a resolution of the first part and the second part of the synthetic light field being displayed to a particular user depends on a number of users for which the input has been generated. For example, when the synthetic light field is to be produced for a single user, the first part of the synthetic light field may be generated by 50 percent of the input, and the second part of the synthetic light field may be generated by a remaining 50 percent of the input. In such a case, an effective resolution per eye would be a half of a native display resolution of the light field display unit. However, when the synthetic light field is to be produced for two users, for each of the two users, the first part of the synthetic light field may be generated by 25 percent of the input, and the second part of the synthetic light field may be generated by 25 percent of the input. In such a case, an effective resolution per eye would be one-fourth of the native display resolution of the light field display unit. In other words, greater the number of users, lower is the resolution of the first part and the second part of the synthetic light field being displayed to a single user, and vice versa.

The present disclosure also relates to the method as described above. Various embodiments and variants disclosed above, with respect to the aforementioned first aspect, apply mutatis mutandis to the method.

Optionally, in the method, the at least one adjustable seat parameter comprises at least one of: a position of the seat, an orientation of a backrest of the seat, a height of a lower part of the seat from a floor of the vehicle, an orientation of the lower part of the seat, a position of a neck support of the seat, an orientation of the neck support, a curvature of a lumbar support of the seat.

Optionally, the plurality of potential positions of the head of the user are estimated in a form of a probability cloud, wherein each potential position in the probability cloud is assigned a probability of said potential position being the correct position of the head of the user, wherein the method further comprises:
  assigning a weight to a probability of a given potential position, based on at least one of: whether the given potential position lies outside or within the 3D volume, whether the given potential position is located in a proximity of a centre of the 3D volume or a periphery of the 3D volume;
  calculating a weighted probability of the given potential position, based on the weight and the probability of the given potential position; and
  when determining the correct position of the head of the user, selecting the one of the plurality of potential positions of the head that lies within the 3D volume and that has a highest weighted probability from amongst weighted probabilities of the plurality of potential positions.

Optionally, in the method, the at least one sensor comprises at least one camera, wherein the method further comprises processing at least one image captured by the at least one camera, to determine the current setting of the at least one adjustable seat parameter.

Optionally, in the method, the step of determining the 3D volume is performed further based on at least one of:
  a simulation model of a human sitting on the seat,
  a biomechanical model of a head, a neck, a spine and a posterior part of a human.

Optionally, the method further comprises:
  estimating a height of an upper body of the user based on the current setting of the at least one adjustable seat parameter; and
  refining at least one of: the simulation model, the biomechanical model, to be specific to the user, based on the height of the upper body of the user.

Optionally, the method further comprises:
  estimating a location of a posterior part of the user, based on the current setting of the at least one adjustable seat parameter; and
  determining an origin of the biomechanical model, based on the location of the posterior part of the user.

Optionally, the method further comprises:
  estimating an orientation of a spine of the user, based on the current setting of the at least one adjustable seat parameter; and
  employing the biomechanical model when determining the 3D volume, based on the orientation of the spine of the user.

Optionally, the method further comprises:
  utilising the tracking means to determine a relative location of a first eye and of a second eye of the user with respect to an optical combiner, wherein the optical combiner is arranged on an optical path of a light field display unit and on an optical path of a real-world light field of a real-world environment;
  refining the relative location of the first eye and of the second eye, based on the correct position of the head of the user;
  generating an input to be employed by the light field display unit for producing a synthetic light field, based on the relative location of the first eye and of the second eye of the user with respect to the optical combiner; and
  employing the input at the light field display unit to produce the synthetic light field presenting virtual content, wherein the optical combiner is employed to reflect a first part and a second part of the synthetic light field towards the first eye and the second eye of the user, respectively, whilst optically combining the first part and the second part of the synthetic light field with the real-world light field.

Optionally, the vehicle comprises a plurality of seats, wherein the method further comprises:
  detecting when a given seat of the vehicle is occupied by a given user, based on at least one of: whether the given seat is occupied, a weight applied to the given seat, a pressure applied to the given seat, sensed by employing at least one additional sensor per seat; and
  performing the step of determining the 3D volume for the given seat, only when it is detected that the given seat is occupied by the given user.

DETAILED DESCRIPTION OF THE DRAWINGS

Figure 1:
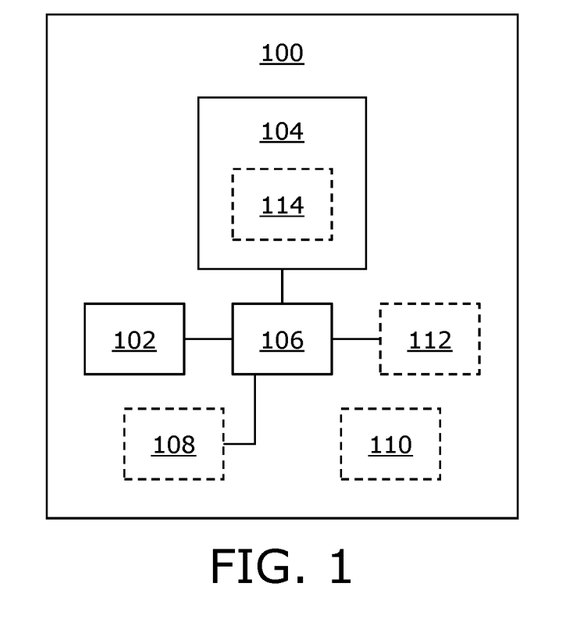
FIG. 1 illustrates a block diagram of an architecture of a system for refining head pose tracking based on seat position and orientation, in accordance with an embodiment of the present disclosure.

Referring to FIG. 1, illustrated is a block diagram of an architecture of a system 100 for refining head pose tracking based on seat position and orientation, in accordance with an embodiment of the present disclosure. The system 100 comprises tracking means 102, at least one sensor (for example, depicted as a sensor 104), and at least one processor (for example, depicted as a processor 106). Optionally, the system 100 further comprises a light field display unit 108, an optical combiner 110, and an additional sensor per seat of a vehicle (for example, depicted as an additional sensor 112 for one seat of the vehicle). Optionally, the sensor 104 comprises at least one camera (for example, depicted as a camera 114). The processor 106 is communicably coupled to the tracking means 102, the sensor 104 and optionally, to the light field display unit 108, the additional sensor 112, and the camera 114.

It may be understood by a person skilled in the art that FIG. 1 includes a simplified example implementation of the system 100, for sake of clarity, which should not unduly limit the scope of the claims herein. It is to be understood that the specific implementation of the system 100 is not to be construed as limiting it to specific numbers or types of tracking means, sensors, processors, light field display units, optical combiners, additional sensors, and cameras. The person skilled in the art will recognize many variations, alternatives, and modifications of embodiments of the present disclosure.

Figure 2:
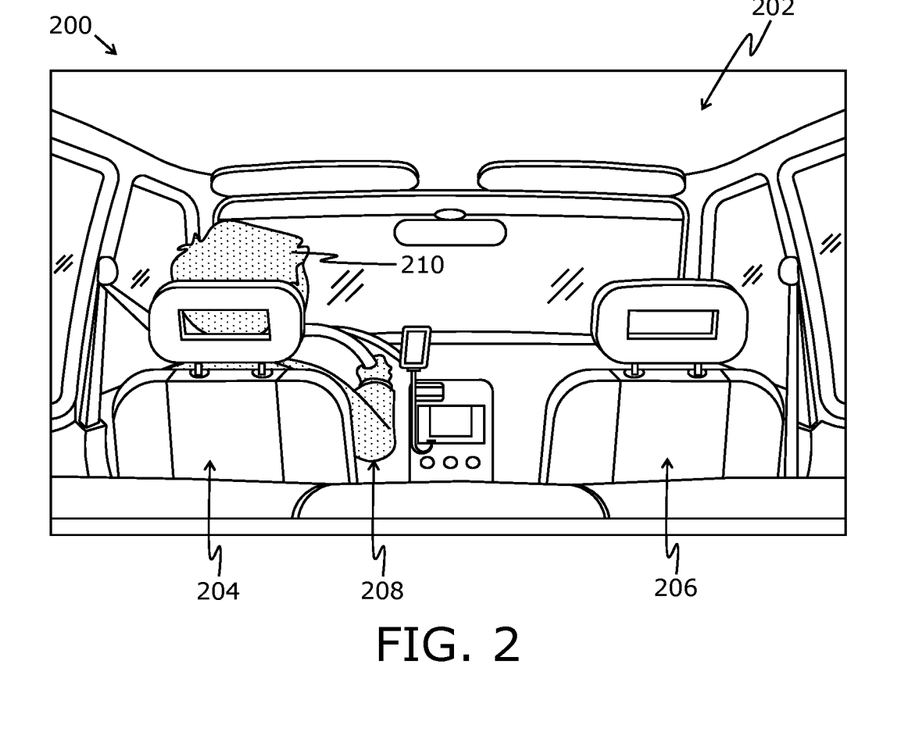
FIG. 2 illustrates a real-world environment in which a system for refining head pose tracking based on seat position and orientation can be employed, in accordance with an embodiment of the present disclosure.

Referring to FIG. 2, illustrated is a real-world environment 200 in which a system for refining head pose tracking based on seat position and orientation can be employed, in accordance with an embodiment of the present disclosure. With reference to FIG. 2, the real-world environment 200 is shown to comprise a vehicle 202 (for example, depicted as a car). The vehicle 202 comprises a plurality of seats, for example, depicted as two seats 204 and 206, for sake of simplicity. A user 208 is shown to be sitting on the seat 204 and is driving the vehicle 202. For sake of simplicity and clarity, only a single user (i.e., the user 208) is shown inside the vehicle 202; however, there could also be other user(s) (for example, co-passenger(s)) sitting on other seat(s) (for example, the seat 206) of the vehicle 202. The system enables in determining a correct position of a head 210 of the user 208, based on which potential positions of the head 210 lie outside a three-dimensional (3D) volume where the head 210 is likely to be present, and which potential positions of the head 210 lie within the 3D volume, wherein all the potential positions of the head 210 are estimated by utilising tracking means.

Figure 3:
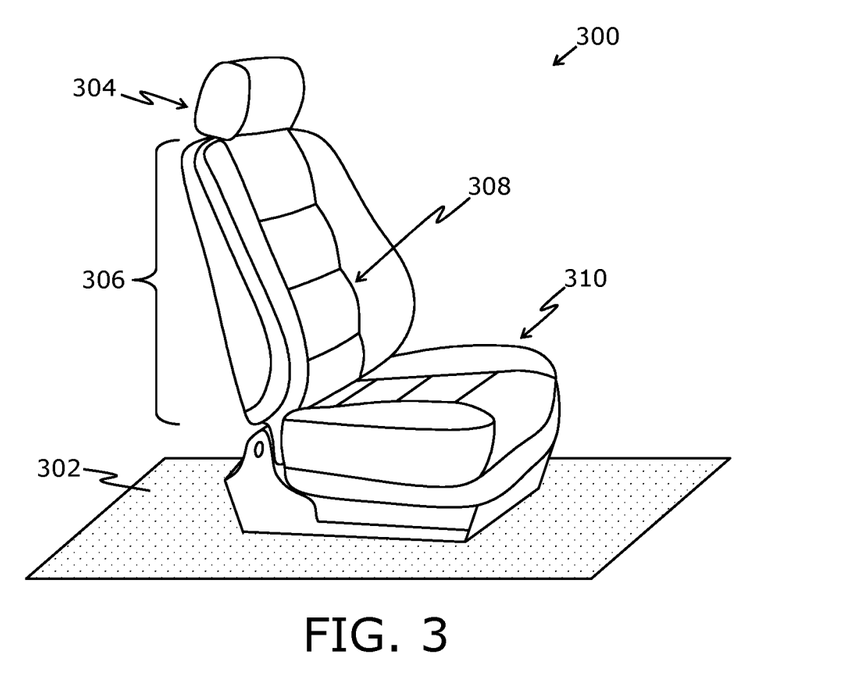
FIG. 3 illustrates an exemplary seat of a vehicle, in accordance with an embodiment of the present disclosure.

Referring to FIG. 3, illustrated is an exemplary seat 300 of a vehicle, in accordance with an embodiment of the present disclosure. With reference to FIG. 3, the seat 300 is mounted on a floor 302 (for example, depicted as a plane having a dotted pattern) of the vehicle. The seat 300 has a neck support 304, a backrest 306, a lumbar support 308, and a lower part 310 (namely, a thigh support).

Figure 4:
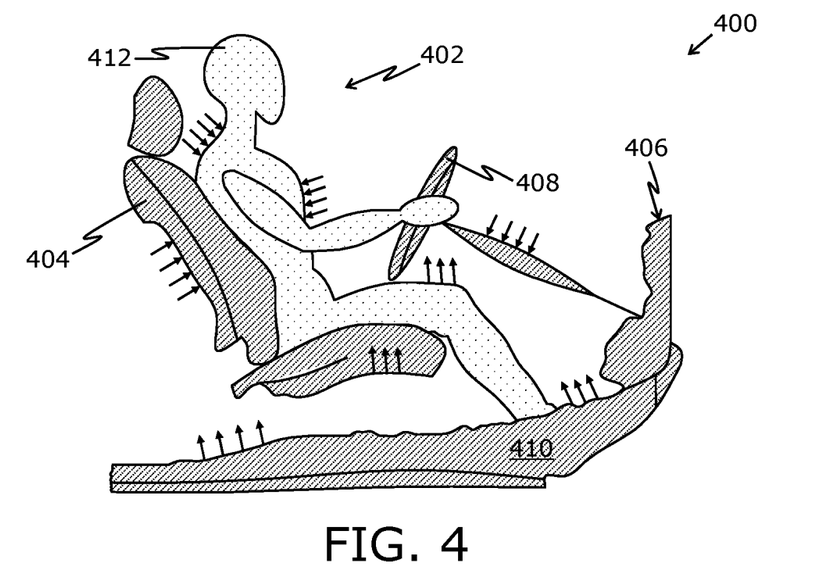
FIG. 4 illustrates an exemplary simulation model of a human sitting on a seat of a vehicle, in accordance with an embodiment of the present disclosure.

Referring to FIG. 4, illustrated is an exemplary simulation model 400 of a human 402 (for example, depicted using a dotted pattern) sitting on a seat 404 (for example, depicted using a diagonal-stripes pattern) of a vehicle 406 (for example, depicted using a diagonal-stripes pattern), in accordance with an embodiment of the present disclosure. With reference to FIG. 4, the human 402 (namely, a user) is shown to be driving the vehicle 406. For sake of simplicity, the vehicle 406 is shown to comprise the seat 404, a steering wheel 408, and a bottom part 410 of the vehicle 406. The simulation model 400 is utilised (by at least one processor) for determining a three-dimensional (3D) volume where a head 412 of the human 402 is likely to be present. This is because expected body posture dynamics of the human 402 in response to a change in a vehicular motion (namely, an acceleration and/or an orientation of the vehicle 406) could be accurately known from the simulation model 400. For sake of simplicity, various lines with solid arrowheads in the simulation model 400 depict directions of impacts (for example, such as forces) on a body of the human 402 and a body of the vehicle 406, when the vehicle 406 is being driven by the human 402. In an example, during an acceleration of the vehicle 406, the head 412 of the human 402 may tilt backward; whereas during braking, the head 412 of the human 402 may lean forward. Additionally, steering manoeuvres performed by the human 402 while driving may result in lateral shifts in a position and/or an orientation of the head 412 of the human 402. Thus, in such scenarios, the simulation model 400 could be utilised to determine expected (namely, realistically possible) positions of the head 412 of the human 402, in order to generate the 3D volume.

Figure 5:
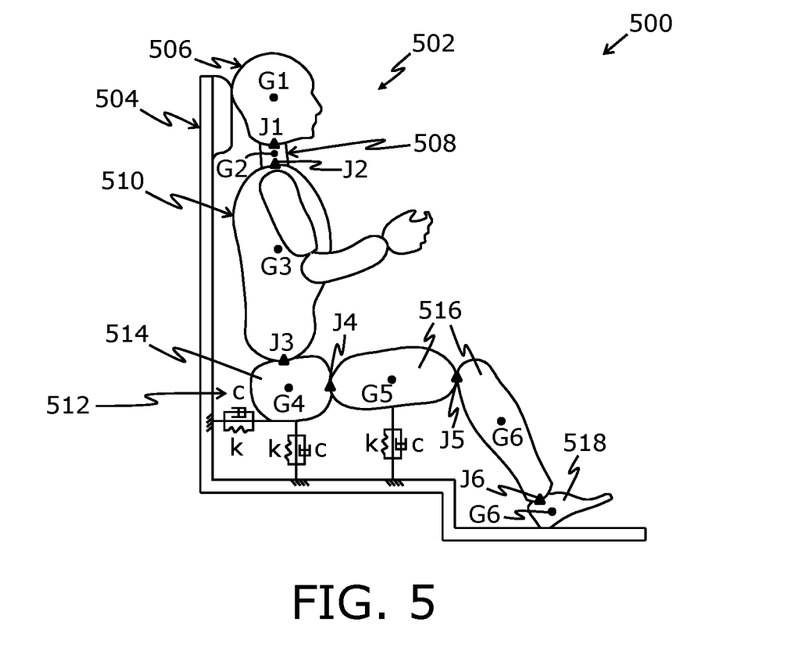
FIG. 5 illustrates an exemplary biomechanical model of a human sitting on a seat of a vehicle, in accordance with an embodiment of the present disclosure.

Referring to FIG. 5, illustrated is an exemplary biomechanical model 500 of a human 502 sitting on a seat 504 of a vehicle, in accordance with an embodiment of the present disclosure. With reference to FIG. 5, the biomechanical model 500 is shown to be generated by considering that a body of the human 502 comprises four parts, namely, a head 506, a neck 508, a spine 510, and a posterior part 512. The posterior part 512 comprises a basin 514, and may further comprise legs 516 and feet 518.

For sake of simplicity and clarity, a side view of the human 502 is depicted in FIG. 5, and thus only one of the (two) legs 516 of the human 502 is visible in FIG. 5. In the biomechanical model 500, G1, G2, G3, G4, G5, and G6 represent centres of gravity of the head 506, the neck 508, the spine 510, the basin 514, the legs 516, and the feet 518, respectively. The centres of gravity G1-G6 are depicted using small solid circles. Mechanical connections J1-J6 are depicted using small solid triangles. J1 represents a mechanical connection (namely, a mechanical joint) between the head 506 and the neck 508. J2 represents a mechanical connection between the neck 508 and the spine 510. J3 represents a mechanical connection between the spine 510 and the basin 514. J4 represents a mechanical connection between the basin 514 and a first portion of the legs 516. J5 represents a mechanical connection between the first portion and a second portion of the legs 516. J6 represents a mechanical connection between the second portion of the legs 516 and the feet 518. Furthermore, all the parts of the human 502 are considered to be coupled to respective mechanical arrangements of the vehicle, wherein a given mechanical arrangement comprises a spring element k and a damping element c. For sake of simplicity and clarity, mechanical arrangements corresponding to only the basin 514 and the legs 516 are shown. It will be appreciated that the respective mechanical arrangements are utilised in the biomechanical model 500 to characterise deformable properties of the parts of the human 502 and vibrations that are transmitted from the seat 504 of the vehicle to the body of the human 504, when the vehicle is in motion (namely, is being driven). The biomechanical model 500 may be generated by considering an average weight (for example, such as 80 kilograms) for the human 502.

FIGS. 2, 3, 4, and 5 are merely examples, which should not unduly limit the scope of the claims herein. A person skilled in the art will recognize many variations, alternatives, and modifications of embodiments of the present disclosure.

Figure 6:
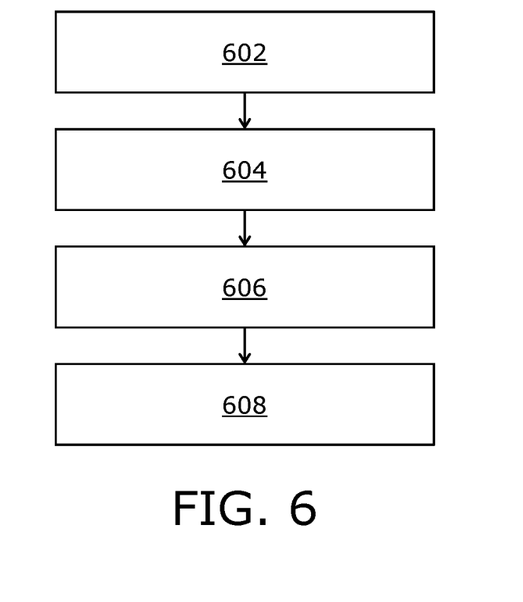
FIG. 6 illustrates steps of a method for refining head pose tracking based on seat position and orientation, in accordance with an embodiment of the present disclosure.

Referring to FIG. 6, illustrated are steps of a method for improving tracking accuracy with head pose prediction, in accordance with an embodiment of the present disclosure. At step 602, tracking means are utilised to estimate a plurality of potential positions of a head of a user sitting on a seat of a vehicle. At step 604, a three-dimensional (3D) volume where the user's head is likely to be present is determined, based on a current setting of at least one adjustable seat parameter of the vehicle, wherein the at least one adjustable seat parameter is detected by employing at least one sensor. At step 606, it is detected whether at least one of the plurality of potential positions of the head lies outside the 3D volume. When it is detected that at least one of the plurality of potential positions of the head lies outside the 3D volume, at step 608, the at least one of the plurality of potential positions is considered as an outlier, and a correct position of the head of the user is determined as one of the plurality of potential positions of the head that lies within the 3D volume.

The aforementioned steps are only illustrative and other alternatives can also be provided where one or more steps are added, one or more steps are removed, or one or more steps are provided in a different sequence without departing from the scope of the claims herein.

Figure 7:
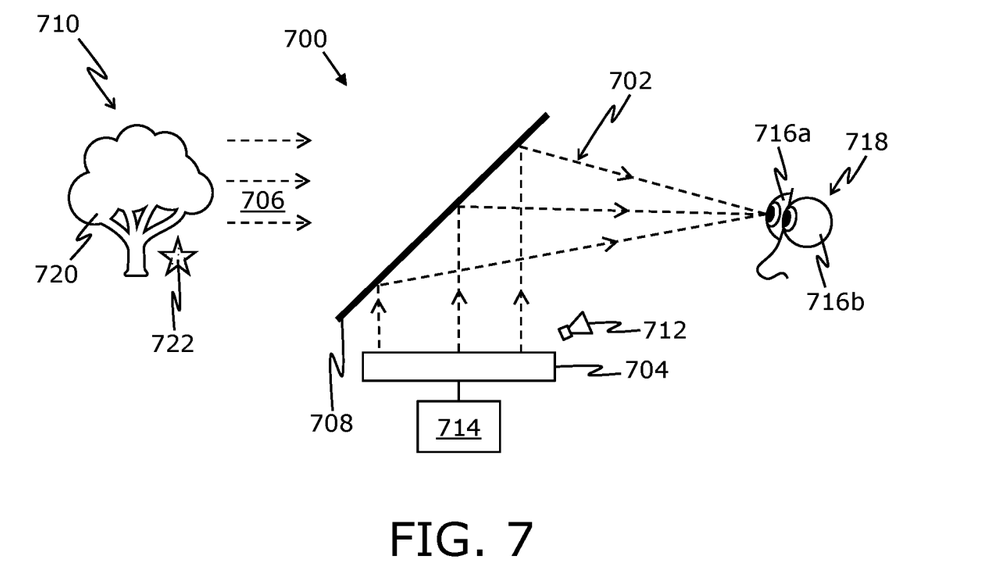
FIG. 7 illustrates an exemplary scenario in which a synthetic light field is produced using a light field display unit, and is optically combined with a real-world light field using an optical combiner, in accordance with an embodiment of the present disclosure.

Referring to FIG. 7, illustrated is an exemplary scenario 700 in which a synthetic light field 702 is produced using a light field display unit 704, and is optically combined with a real-world light field 706 using an optical combiner 708, in accordance with an embodiment of the present disclosure. With reference to FIG. 7, a real-world environment 710 is shown, where tracking means 712 is utilised by at least one processor (depicted as a processor 714) to determine a relative location of a first eye 716a and of a second eye 716b of a user 718 with respect to an optical combiner 708, the optical combiner 708 being arranged on an optical path of the light field display unit 704 and on an optical path of the real-world light field 706 of the real-world environment 710. The tracking means 712 is shown to be implemented, for example, as at least one tracking camera. In the real-world environment 710, there are one or more real-world objects, depicted as a real-world object 720 (shown as a tree). An input to be employed by the light field display unit 704 is generated by the processor 714, based on the relative location of the first eye 716a and of the second eye 716b of the user 718 with respect to the optical combiner 708. The input is employed at the light field display unit 704 to produce the synthetic light field 702 presenting virtual content 722, for example, such as a virtual object (depicted as a star having a dotted pattern). For illustration purposes only, the virtual content 722 is shown to be presented at an optical depth that is (almost) same as an optical depth of the real-world object 720. The optical combiner 708 is employed to reflect a first part and a second part of the synthetic light field 702 towards the first eye 716a and the second eye 716b, respectively, whilst optically combining the first part and the second part of the synthetic light field 702 with the real-world light field 706.

FIG. 7 is merely an example, which should not unduly limit the scope of the claims herein. A person skilled in the art will recognize many variations, alternatives, and modifications of embodiments of the present disclosure.

The invention claimed is:

1. A system comprising:
    tracking means;
    at least one sensor employed to detect a current setting of at least one adjustable seat parameter of a vehicle; and
    at least one processor configured to:
        utilise the tracking means to estimate a plurality of potential positions of a head of a user sitting on a seat of the vehicle;
        determine a three-dimensional (3D) volume where the user's head is likely to be present, based on the current setting of the at least one adjustable seat parameter;
        detect whether at least one of the plurality of potential positions of the head lies outside the 3D volume; and
        when it is detected that at least one of the plurality of potential positions of the head lies outside the 3D volume, consider the at least one of the plurality of potential positions as an outlier, and determine a correct position of the head of the user as one of the plurality of potential positions of the head that lies within the 3D volume.

2. The system of claim 1, wherein the at least one adjustable seat parameter comprises at least one of: a position of the seat, an orientation of a backrest of the seat, a height of a lower part of the seat from a floor of the vehicle, an orientation of the lower part of the seat, a position of a neck support of the seat, an orientation of the neck support, a curvature of a lumbar support of the seat.

3. The system of claim 1, wherein the plurality of potential positions of the head of the user are estimated in a form of a probability cloud, wherein each potential position in the probability cloud is assigned a probability of said potential position being the correct position of the head of the user, wherein the at least one processor is configured to:
    assign a weight to a probability of a given potential position, based on at least one of: whether the given potential position lies outside or within the 3D volume, whether the given potential position is located in a proximity of a centre of the 3D volume or a periphery of the 3D volume;
    calculate a weighted probability of the given potential position, based on the weight and the probability of the given potential position; and
    when determining the correct position of the head of the user, select the one of the plurality of potential positions of the head that lies within the 3D volume and that has a highest weighted probability from amongst weighted probabilities of the plurality of potential positions.

4. The system of claim 1, wherein the at least one sensor comprises at least one camera, wherein the at least one processor is configured to process at least one image captured by the at least one camera, to determine the current setting of the at least one adjustable seat parameter.

5. The system of claim 1, wherein the 3D volume is determined further based on at least one of:
    a simulation model of a human sitting on the seat,
    a biomechanical model of a head, a neck, a spine and a posterior part of a human.

6. The system of claim 5, wherein the at least one processor is configured to:
    estimate a height of an upper body of the user based on the current setting of the at least one adjustable seat parameter; and
    refine at least one of: the simulation model, the biomechanical model, to be specific to the user, based on the height of the upper body of the user.

7. The system of claim 5, wherein the at least one processor is configured to:
    estimate a location of a posterior part of the user, based on the current setting of the at least one adjustable seat parameter; and
    determine an origin of the biomechanical model, based on the location of the posterior part of the user.

8. The system of claim 5, wherein the at least one processor is configured to:
    estimate an orientation of a spine of the user, based on the current setting of the at least one adjustable seat parameter; and employ the biomechanical model when determining the 3D volume, based on the orientation of the spine of the user.

9. The system of claim 1, further comprising a light field display unit, and an optical combiner arranged on an optical path of the light field display unit and on an optical path of a real-world light field of a real-world environment, wherein the at least one processor is configured to:
utilise the tracking means to determine a relative location of a first eye and of a second eye of the user with respect to the optical combiner;
refine the relative location of the first eye and of the second eye, based on the correct position of the head of the user;
generate an input to be employed by the light field display unit for producing a synthetic light field, based on the relative location of the first eye and of the second eye of the user with respect to the optical combiner; and
employ the input at the light field display unit to produce the synthetic light field presenting virtual content, wherein the optical combiner is employed to reflect a first part and a second part of the synthetic light field towards the first eye and the second eye of the user, respectively, whilst optically combining the first part and the second part of the synthetic light field with the real-world light field.

10. The system of claim 1, wherein the vehicle comprises a plurality of seats, and the system further comprises at least one additional sensor per seat, employed to sense at least one of: whether a given seat is occupied, a weight applied to the given seat, a pressure applied to the given seat,
wherein the at least one processor is configured to:
detect when the given seat is occupied by a given user, based on the at least one of: whether the given seat is occupied, the weight applied to the given seat, the pressure applied to the given seat; and
perform the step of determining the 3D volume for the given seat, only when it is detected that the given seat is occupied by the given user.

11. A method comprising:
utilising tracking means to estimate a plurality of potential positions of a head of a user sitting on a seat of a vehicle;
determining a three-dimensional (3D) volume where the user's head is likely to be present, based on a current setting of at least one adjustable seat parameter of the vehicle, wherein the at least one adjustable seat parameter is detected by employing at least one sensor; and
detecting whether at least one of the plurality of potential positions of the head lies outside the 3D volume; and
when it is detected that at least one of the plurality of potential positions of the head lies outside the 3D volume, considering the at least one of the plurality of potential positions as an outlier, and determining a correct position of the head of the user as one of the plurality of potential positions of the head that lies within the 3D volume.

12. The method of claim 11, wherein the at least one adjustable seat parameter comprises at least one of: a position of the seat, an orientation of a backrest of the seat, a height of a lower part of the seat from a floor of the vehicle, an orientation of the lower part of the seat, a position of a neck support of the seat, an orientation of the neck support, a curvature of a lumbar support of the seat.

13. The method of claim 11, wherein the plurality of potential positions of the head of the user are estimated in a form of a probability cloud, wherein each potential position in the probability cloud is assigned a probability of said potential position being the correct position of the head of the user, wherein the method further comprises:
assigning a weight to a probability of a given potential position, based on at least one of: whether the given potential position lies outside or within the 3D volume, whether the given potential position is located in a proximity of a centre of the 3D volume or a periphery of the 3D volume;
calculating a weighted probability of the given potential position, based on the weight and the probability of the given potential position; and
when determining the correct position of the head of the user, selecting the one of the plurality of potential positions of the head that lies within the 3D volume and that has a highest weighted probability from amongst weighted probabilities of the plurality of potential positions.

14. The method of claim 11, wherein the at least one sensor comprises at least one camera, and wherein the method further comprises processing at least one image captured by the at least one camera, to determine the current setting of the at least one adjustable seat parameter.

15. The method of claim 11, wherein the step of determining the 3D volume is performed further based on at least one of:
a simulation model of a human sitting on the seat,
a biomechanical model of a head, a neck, a spine and a posterior part of a human.

16. The method of claim 15, further comprising:
estimating a height of an upper body of the user based on the current setting of the at least one adjustable seat parameter; and
refining at least one of: the simulation model, the biomechanical model, to be specific to the user, based on the height of the upper body of the user.

17. The method of claim 15- or 16, further comprising:
estimating a location of a posterior part of the user, based on the current setting of the at least one adjustable seat parameter; and
determining an origin of the biomechanical model, based on the location of the posterior part of the user.

18. The method of claim 15, further comprising:
estimating an orientation of a spine of the user, based on the current setting of the at least one adjustable seat parameter; and
employing the biomechanical model when determining the 3D volume, based on the orientation of the spine of the user.

19. The method of claim 11, further comprising:
utilising the tracking means to determine a relative location of a first eye and of a second eye of the user with respect to an optical combiner, wherein the optical combiner is arranged on an optical path of a light field display unit and on an optical path of a real-world light field of a real-world environment;
refining the relative location of the first eye and of the second eye, based on the correct position of the head of the user;
generating an input to be employed by the light field display unit for producing a synthetic light field, based on the relative location of the first eye and of the second eye of the user with respect to the optical combiner; and
employing the input at the light field display unit to produce the synthetic light field presenting virtual content, wherein the optical combiner is employed to reflect a first part and a second part of the synthetic light field towards the first eye and the second eye of the user, respectively, whilst optically combining the first part and the second part of the synthetic light field with the real-world light field.

20. The method of claim 11, wherein the vehicle comprises a plurality of seats, and wherein the method further comprises:
   detecting when a given seat of the vehicle is occupied by a given user, based on at least one of: whether the given seat is occupied, a weight applied to the given seat, a pressure applied to the given seat, sensed by employing at least one additional sensor per seat; and
   performing the step of determining the 3D volume for the given seat, only when it is detected that the given seat is occupied by the given user.

* * * * *